C. W. BLAKE.
RESILIENT TIRE.
APPLICATION FILED OCT. 11, 1910.
1,008,111.
Patented Nov. 7, 1911.
2 SHEETS—SHEET 1.
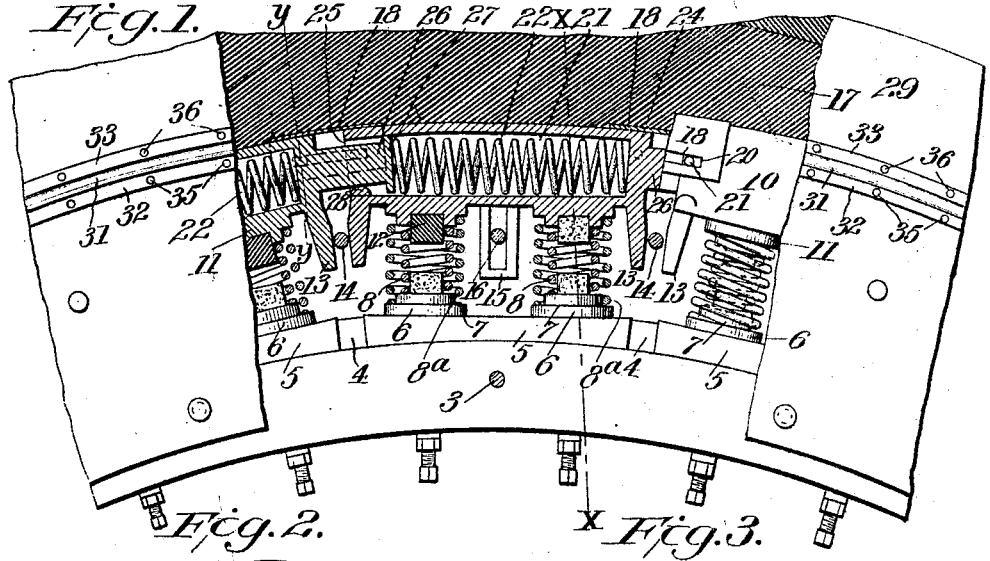
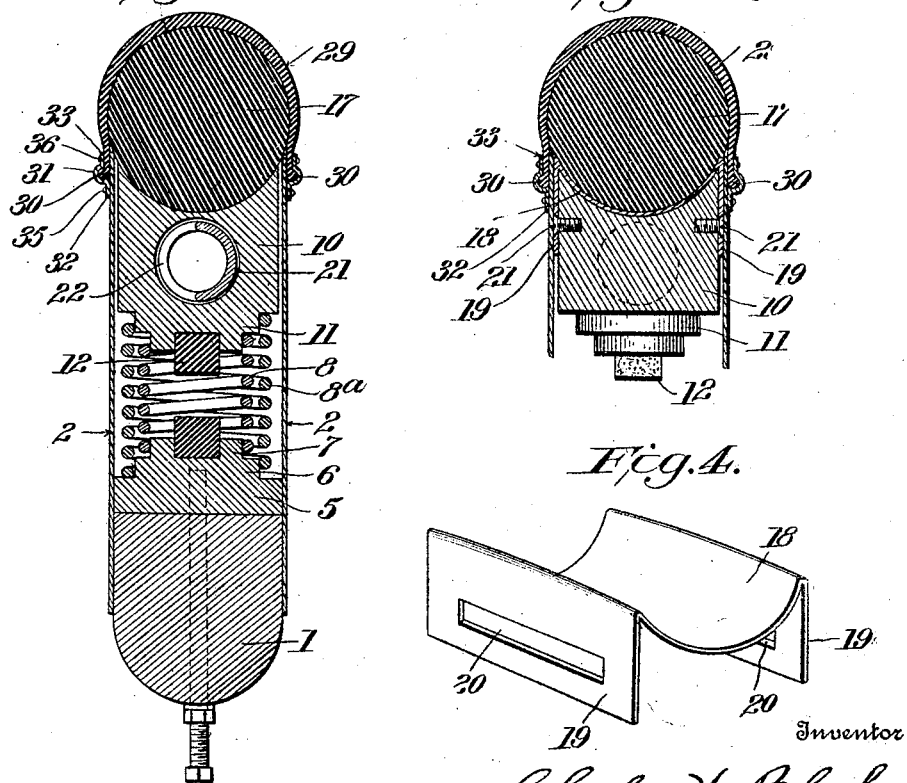
Witnesses
C. H. Walker.
Ernest P. Hutchinson.
Inventor
Charles W. Blake,
By Edson Bro's,
Attorneys

C. W. BLAKE.
RESILIENT TIRE.
APPLICATION FILED OCT. 11, 1910.

1,008,111.

Patented Nov. 7, 1911.
2 SHEETS—SHEET 2.

Witnesses

Inventor
Charles W. Blake,
By Edson Bros.,
Attorneys

UNITED STATES PATENT OFFICE.

CHARLES W. BLAKE, OF DELAWARE CITY, DELAWARE.

RESILIENT TIRE.

1,008,111.  Specification of Letters Patent.  Patented Nov. 7, 1911.

Application filed October 11, 1910. Serial No. 586,533.

*To all whom it may concern:*

Be it known that I, CHARLES W. BLAKE, a citizen of the United States, residing at Delaware City, in the county of Newcastle and State of Delaware, have invented certain new and useful Improvements in Resilient Tires; and I do hereby declare the following to be a full, clear, and exact description of the invention, such as will enable others skilled in the art to which it appertains to make and use the same.

My invention relates to resilient vehicle tires.

It has for its object to increase the flexibility and durability of the tire.

Other objects will become apparent from the following description.

The invention consists in the features of construction, combinations and arrangements of parts, hereinafter set forth, illustrated in the accompanying drawings, and more particularly pointed out in the appended claims.

Figure 5:
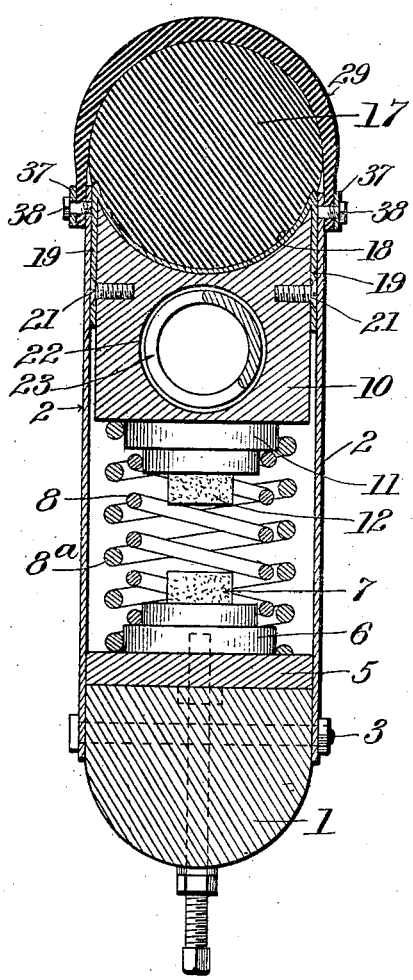
Figure 6:
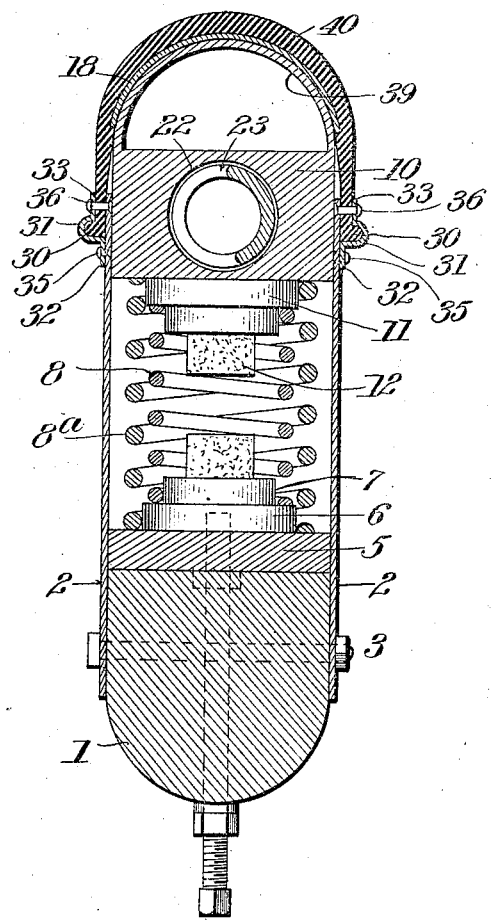

In the accompanying drawing, illustrating the preferred embodiments of my invention: Figure 1 is a broken side view of part of a wheel rim carrying one of my double tires. Fig. 2 is a sectional view on the line x—x of Fig. 1. Fig. 3 is a sectional view on the line y—y of Fig. 1. Fig. 4 is a detailed view of one of the shield plates, Fig. 5 is a sectional view similar to Fig. 2 but showing a modified construction of fastening device for securing the outer tire to the flanges, and Fig. 6 is a cross sectional view of a modified form of rim on which no inner tire is used.

Referring more particularly to Figs. 1 to 4, inclusive, of the drawings, 1 designates the felly of the wheel which has outwardly extending flanges 2 secured to it by any suitable means, such as the bolts 3. Between these flanges and arranged crosswise on the outer surface of the felly are lugs 4 spaced equidistant apart and serving as guides for plates or shoes 5 which conform on their inner faces to the felly but are flat on their outer surfaces. Outwardly extending tables 6 are formed on each of the shoes 5. Said tables are stepped, as at 7, to provide for centering and retaining helical springs 8 arranged interiorly of larger similar springs 8ª. The springs of each pair are coiled in opposite directions whereby the force thereof is directed in true radial lines. A bumper 9 of rubber or other suitable flexible material is fixed in a socket in the outer faces of each table, or otherwise secured thereto.

An outer shoe 10 having a table 11 and bumper 12, similar to those on the shoes 5, is arranged above each of the latter shoes. Each shoe 10 has a flat under surface and a curved outer surface conforming to the curvature of the wheel and to the inner surface of the tire. Each of said shoes 10 is equipped with inwardly extending lugs 13, at its extremities, which are guided between the shanks of bolts 14 passed transversely through the flanges 2 at points arranged radially above the lugs 4 on the felly. The shoe 10 is further guided and retained against endwise movement by a slotted lug 15, preferably arranged at the middle of said shoe, and engaging a bolt 16 also passed transversely through the flanges 2. Said lugs 15 and bolts 16 also serve to retain the shoes 10 against excessive outward movement when the tire is removed. The shoes 10 are grooved on their outer faces to receive the inner tire 17. Plates 18 are let into the under surface of said tire and span the spaces between the adjacent ends of the shoes 10 whereby the tire is prevented from entering between said shoes and the unrestricted action of the latter is insured. Said plates have lateral flanges 19 arranged at the sides of the shoes and provided with longitudinally extending slots 20 in which project pins 21 secured to the sides of said shoes. Said pins are preferably made in the form of screw bolts, as illustrated in Fig. 3, the heads of said bolts being countersunk in the grooves so that they will not project beyond the outer surfaces of the plates. It will be noted that the slots 20 will allow the shoes to work back and forth toward and away from one another, and that the bolts will retain said plates in proper position and prevent them from sliding to positions where they would leave the spaces between the shoes uncovered. Each of the shoes 10 is provided with a longitudinally extending socket or chamber 22 in which there is housed a coiled spring 23. One end 24 of each shoe is closed, while its other end 25 is open. Made integral with the closed end or secured thereto in any suitable manner there is a projecting lug 26 of arcuate shape to conform to the curvature of the wheel rim. This lug extends into the open end 25 of the adjacent shoe 10, and is provided with a flange 27 on its extremity. Said lugs 26 hold their shoes in uniform alinement, while allowing them to move toward and away from one another, and retain the shield plates flat and straight at all times.

The spring 23 in each shoe bears against the closed end of its shoe and against the flanged extremity of the lug of the adjacent shoe which projects into the open end of its shoe. The tendency of said springs is, therefore, to keep the shoes expanded at a uniform distance apart all around the wheel and to give more elasticity to the wheel. A stop or projection 28 is arranged in the open end of each of the shoes to prevent the lug 26 from being entirely withdrawn therefrom by engaging the flange 27. Said projections 28 also hold the ends of the lugs 26 off of the inner edges of the shoes so they will not jam when telescoped. The outer tire 29 is placed over the inner tire 17 and secured to the outer edges of the flanges 2 in the manner illustrated in Fig. 2. It will be observed that the lateral edges of said outer tire have enlarged beads 30 formed thereon. These beads are fitted in the grooves of channeled strips 31 having flanges 32 and 33 at the opposite edges of their grooves or channels 34. Said strips are secured to the flanges 2 by bolts 35 and 36 passed respectively through their inner flanges 32 and outer flanges 33. The bolts 36 in the outer flanges 33, of necessity, also pass through the outer tire outside or above the beads 30. It will thus be seen that the fastening, just described, very firmly secures the outer tire to the flanges and will prevent dust or dirt from entering the interior where it would be apt to clog or otherwise impair the operation of the springs.

The modified construction illustrated in Fig. 5, relates to the manner of securing the outer tire to the flanges 2. As shown in this figure, a flat strip 37 is used instead of the channeled strip shown in Fig. 4. The edges of the tire 29 are placed between the strips 37 and the edges of the flanges 2 and secured to the latter by means of bolts 38 passed through all three. This construction is simpler than that illustrated in Fig. 2, and is very efficient.

As illustrated in Fig. 6, the inner tire may be dispensed with and only the outer one used. The word "tire" as used in the appended claims should, therefore, be understood as meaning either a double tire or a single outer tire.

When the outer tire is used alone, the telescoping shoes are made to conform to it on their outer surfaces, as at 39 in Fig. 6. In this arrangement, the shield plates 18 are preferably let into the outer tire, as at 40.

I claim:

1. The combination, with a felly of a wheel, and a tire, of shoes arranged on the inner surface of said tire, elastic cushioning devices arranged between said shoes and the felly, each of said shoes having a longitudinally extending socket opening at one end thereof, a lug arranged on the other end of each shoe and projecting into the open end of the socket in the adjacent shoe, and elastic cushioning means arranged in said sockets and engaging said lugs for normally holding said shoes at a uniform distance apart.

2. The combination, with a felly of a wheel, and a tire, of shoes arranged on the inner surfaces of said tire, elastic cushioning devices arranged between said shoes and the felly, each of said shoes having a longitudinally extending socket opening at one end thereof, a lug arranged on the other end of each shoe and projecting into the open end of the socket in the adjacent shoe, elastic cushioning means arranged in said sockets and engaging said lugs for normally holding said shoes at a uniform distance apart, and means to limit the outward movement of each of said lugs in the socket into which it extends.

3. The combination, with a felly of a wheel, and a tire, of shoes arranged on the inner surface of said tire, elastic cushioning devices arranged between said shoes and the felly, each of said shoes having a longitudinally extending socket opening at one end thereof, a lug arranged on the other end of each shoe and projecting into the open end of the socket in the adjacent shoe, and elastic cushioning means arranged in said sockets and engaging said lugs for normally holding said shoes at a uniform distance apart, flanges on the ends of said lugs and projections at the open ends of said sockets adapted to limit the outward movement of said lugs by coming in contact with said flanges.

4. The combination, with a felly of a wheel, and a tire, of shoes arranged on the inner surface of said tire, elastic cushioning devices arranged between said shoes and the felly, elastic cushioning devices arranged within said shoes and normally holding them at a uniform distance apart, shield plates arranged between the shoes and tire and spanning the spaces between said shoes for the purpose specified, said plates having slots therein, and pins secured to said shoes and extending into said slots for retaining said plates in proper position.

5. The combination, with a felly of a wheel, and a tire, of shoes arranged on the inner surface of said tire, elastic cushioning devices arranged between said shoes and the felly, each of said shoes having a longitudinally extending socket opening at one end thereof, a lug arranged on the other end of said shoe and projecting into the open end of the socket in the adjacent shoe, elastic cushioning means for normally holding said shoes at a uniform distance apart, and shield plates arranged between the shoes and tire and spanning the spaces between said shoes for the purpose specified.

6. The combination, with a felly of a wheel, and a tire, of shoes arranged on the inner surfaces of said tire, elastic cushioning devices arranged between said shoes and the felly, each of said shoes having a longitudinally extending socket opening at one end thereof, a lug arranged on the other end of each shoe and projecting into the open end of the socket in the adjacent shoe, elastic cushioning means arranged in said sockets and engaging said lugs for normally holding said shoes at a uniform distance apart, means to limit the outward movement of each of said lugs in the socket into which it extends, and shield plates arranged between the shoes and tire and spanning the spaces between said shoes for the purpose specified.

7. The combination, with a felly of a wheel, and a tire, of shoes arranged on the inner surface of said tire, elastic cushioning devices arranged between said shoes and the felly, each of said shoes having a longitudinally extending socket opening at one end thereof, a lug arranged on the other end of said shoe and projecting into the open end of the socket in the adjacent shoe, elastic cushioning means for normally holding said shoes at a uniform distance apart, and shield plates arranged between the shoes and tire and spanning the spaces between said shoes for the purpose specified, said plates having slots therein and pins secured to said shoes and extending into said slots for retaining said plates in proper position.

8. The combination, with a felly of a wheel, and a tire, of shoes arranged on the inner surfaces of said tire, elastic cushioning devices arranged between said shoes and the felly, each of said shoes having a longitudinally extending socket opening at one end thereof, a lug arranged on the other end of each shoe and projecting into the open end of the socket in the adjacent shoe, elastic cushioning means arranged in said sockets and engaging said lugs for normally holding said shoes at a uniform distance apart, means to limit the outward movement of each of said lugs in the socket into which it extends, and shield plates arranged between the shoes and tire and spanning the spaces between said shoes for the purpose specified, said plates having slots therein, and pins secured to said shoes and extending into said slots for retaining said plates in proper position.

9. The combination, with a felly of a wheel, of flanges secured to said felly and extending outwardly therefrom, a tire, elastic cushioning devices between said felly and tire, the latter having enlarged beads at its edges which overlap the outer edges of said flanges, and rigid channeled strips secured to the flanges, the beads on the tire fitting the channels in said strips and filling the space between said strips and the outer margins of said flanges.

10. The combination, with a felly of a wheel, of flanges secured to said felly and extending outwardly therefrom, a tire, elastic cushioning devices between said felly and tire, the latter having enlarged beads at its edges which overlap the outer edges of said flanges, rigid channeled strips secured to the flanges, the beads on the tire fitting the channels in said strips and filling the space between said strips and the outer margins of said flanges, and fastening means passed through the strips, tire and flanges and arranged outwardly beyond said beads.

In testimony whereof, I affix my signature, in presence of two witnesses.

CHARLES W. BLAKE.

Witnesses:
C. EARL BAUM,
G. A. CLARK.